United States Patent

[11] 3,555,193

[72] Inventors Paul M. Brand
Fort Lauderdale;
Lawrence Reich, West Hollywood, Fla.
[21] Appl. No. 720,938
[22] Filed Apr. 12, 1968
[45] Patented Jan. 12, 1971
[73] Assignee Lorbon Manufacturing Co., Inc.
West Hollywood, Fla.
a corporation of Florida

[54] LONG DISTANCE TIMER
5 Claims, 6 Drawing Figs.

[52] U.S. Cl. .......... 179/7.1, 58/39.5, 58/152
[51] Int. Cl. .......... H04m 15/30
[50] Field of Search .......... 58/152T, 145, 39.5; 179/7.1; 58/65, 85.5, 152T, 39.5, 22.9, 74; 179/7.1

[56] References Cited
UNITED STATES PATENTS
3,136,114 6/1964 Jauch .......... 58/39.5
OTHER REFERENCES
Telephone Timer, British Communications and Electronics, p 876, Nov. 1961

*Primary Examiner*—Kathleen H. Claffy
*Assistant Examiner*—Jan S. Black
*Attorney*—Kinzer, Dorn and Zickert

ABSTRACT: The overtime cost of a long distance telephone call is registered on a dial, the dial being turned by a timing motor which is energized through a manual start button when the conversation is commenced. The motor is also effective to wind a spring for resetting the dial. At the end of the call the motor is disabled by pressing a stop button, the dial is stopped in a position showing the overtime cost of the call and the spring is in a tensioned state. At the commencement of the next call the dial is instantly reset by releasing the spring automatically as an incident to operating the start button.

INVENTORS.
PAUL M. BRAND
LAWRENCE REICH
BY
Wallace, Kinzer and Dorn
ATTORNEYS

INVENTORS.
PAUL M. BRAND
LAWRENCE REICH
BY
Wallace Kinzer and Dorn
ATTORNEYS

LONG DISTANCE TIMER

This invention relates to a device for indicating the cost of a long distance telephone call.

Those who frequently rely on long distance calling services, particularly in the instance of small business offices, sometimes prefer to be advised by the telephone company as to time and charges, and the operator is requested to furnish such information following the termination of the call. The same practice is sometimes adopted by individuals at home. The practice serves not only to facilitate expense accounting in offices, but also fits budget records for households. Additionally, there are some individuals who need to be reminded as to what a long distance call is costing. The primary object of the present invention is to construct a device which will enable persons instituting a long distance call not only to observe the extent to which the cost of the call is accumulating but also to note the cost at the end of the call. More specifically, an object of the present invention is to construct such a device at cost which will justify its utilization and to realize this end by a construction which will record the overtime cost at the end of the call while establishing conditions which will account for instant resetting at the start of the next call. The user then adds the overtime charge to the basic 3-minute charge as to which the operator would advise.

The foregoing objects are realized by turning the shaft of a cost indicator dial through a normally engaged clutch, the driving member of the clutch being driven by a timing (constant speed) motor. During the course of timing the call, a spring is wound and remains wound at the end of the call. When a start button is operated at the commencement of the next call to actuate a starting switch for the motor, the clutch is simultaneously disengaged allowing the spring to release which resets the dial.

Other and further objects of the present invention will be apparent from the following description and claims and are illustrated in the accompanying drawings which, by way of illustration, shows a preferred embodiment of the present invention and the principles thereof and what is now considered to be the best mode contemplated for applying these principles. Other embodiments of the invention embodying the same or equivalent principles may be used and structural changes may be made as desired by those skilled in the art without departing from the present invention.

Figures 2, 6:
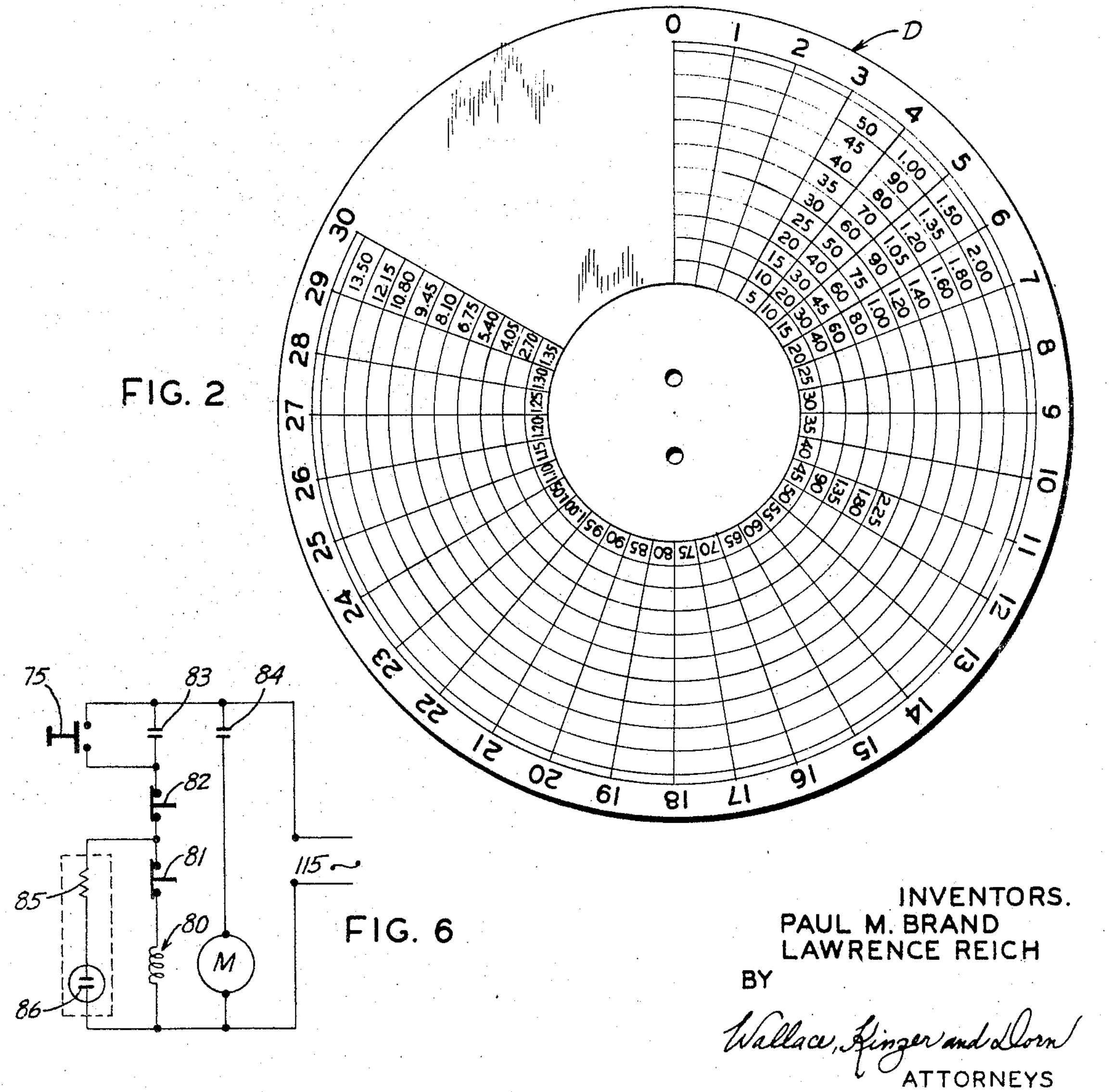
FIG. 2 is a plan view of the cost indicating dial, but on a larger scale than FIG. 1.
FIG. 6 is a wiring diagram.
Figure 4:
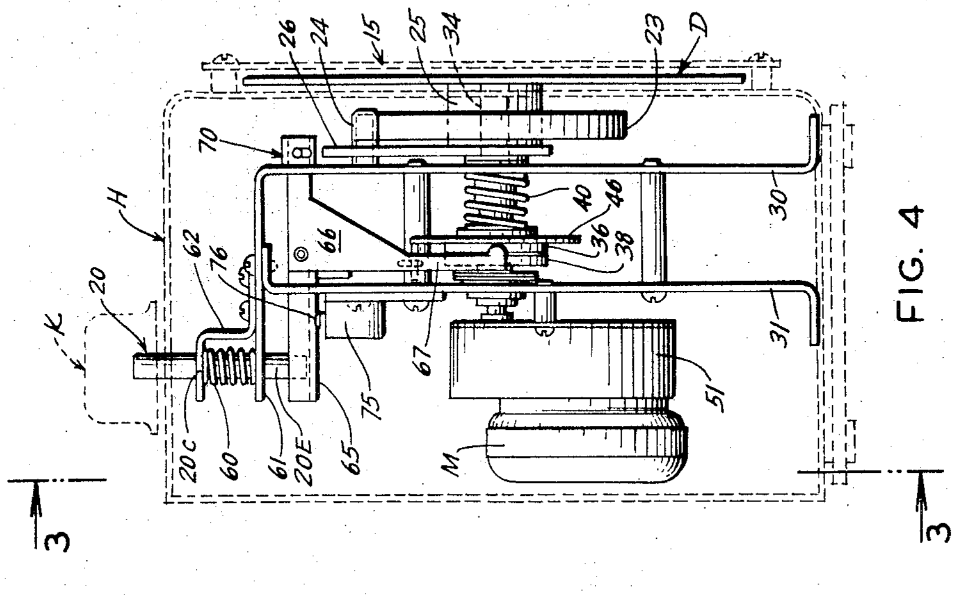
FIG. 4 is a side elevation of the assembled operating parts of the device as a whole, the housing and certain other parts being in phantom.
Figure 3:
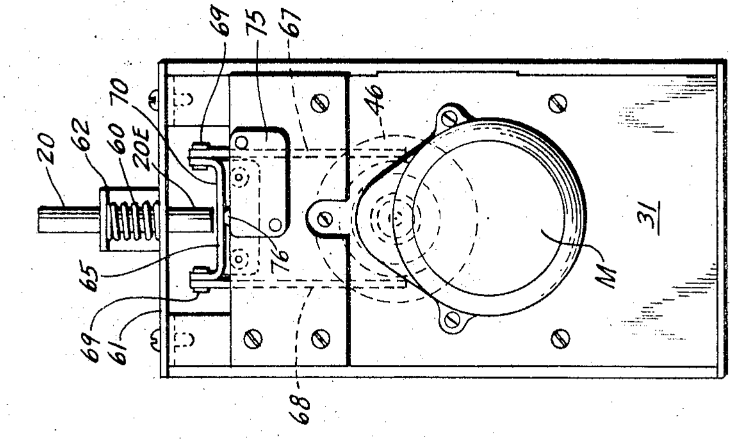
FIG. 3 is a front elevation on the line 3–3 of FIG. 4.

Referring to FIG. 4, a cost indicating dial D for registering the cost of a long distance call is arranged to be driven by a motor M, and as will be described hereinafter motor M is energized by the caller when the telephone operator establishes the connection with the other party. The apparatus shown in FIG. 4 is confined within a housing H, and the dial D, FIG. 2, is accurately dimensioned with regard to the timing (constant speed) motor M so that the time and charge data on the dial D are in effect synchronized in a rotary sense with the motor. Thus as shown in FIG. 2 the dial D is subdivided into 30 segments representing 1 minute increments, 30 in number. Furthermore, the dial is subdivided by concentric circles into overtime charges, from 5 cents for each 1 minute overtime to 50 cents for each 1 minute overtime. In accordance with the prevailing standards, overtime commences at the end of the third minute, and of course the rate varies depending upon the distance of the call.

Figure 1:
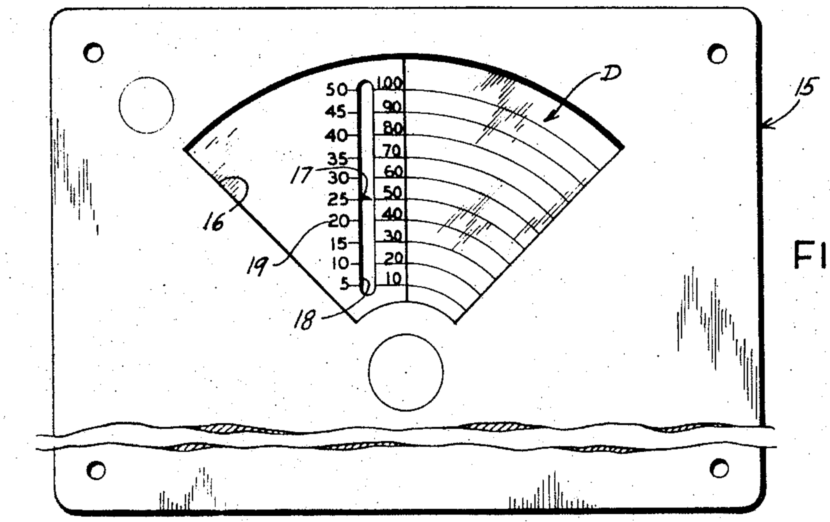
FIG. 1 is a fragmentary plan view of an escutcheon plate.

The indicator dial is covered by an escutcheon plate 15, FIGS. 1 and 4 and a window opening 16 of segmental form is presented therein to expose the corresponding portion of a 1 minute segment of the dial D so that as the dial turns, the subdivided segments thereof pass beneath the window 16. The escutcheon plate may be made of clear plastic, painted except for the window which remains transparent.

When the caller places a call, the caller will ask the operator for the overtime charge and will then position an index slide 17 along one edge of a slot 18 opposite the correct overtime charge datum printed in a row 19 at one side of the window 16. Thus the index slide 17 will in effect by appropriately positioned before commencement of the actual call at the concentric portion of the dial D which corresponds to the cost data for that call.

The dial D is normally in the position which it attained at the end of the last call, having been rotated to that position by the timing motor M, and in this connection it is to be pointed out that the device includes both a start button or plunger 20, FIG. 4, and a stop button or plunger (not shown) at one side of the housing. A clock-type spring 23, FIG. 4, was wound by the motor during the previous call, in a manner to be explained and remains in a state of tension until the next call. One end of the spring 23 is anchored to a zero stop 24, FIG. 4, and the other end is anchored to a hub 25 which carries the dial D.

Thus when the motor is in operation the hub 25 is turned, the dial D is turned and the spring 23 is wound.

The hub 25 also carries a striker arm 26. When the device is reset to zero or start position at the commencement of the next call, the spring 23 is released, as will be described, and the striker 26 returns to zero position in engagement with the zero stop 24, thereby locating the dial D in zero or no-time position. This return action or resetting operation requires only a fraction of a second and does not interfere with timing the call.

The zero stop 24 is fixed to and projects from one side of a supporting bracket 30 anchored within the housing, and the support bracket 30 is spaced from and is joined to a second bracket 31 also anchored within the housing. These two brackets serve to support the various operating parts of the device.

The hub 25 is on the same side of the bracket 30 as the zero stop 24 and extends normal thereto. The hub 25 is fixed to a shaft 34, FIG. 5, which extends through the bracket 30, and the opposite end of this shaft is provided with a key 35 which carries a clutch plate 36. This clutch plate is normally held in driven engagement with an opposed driving clutch plate 38 driven through the motor M as will be described, the two clutch plates being provided with friction facings 39. It will be appreciated that the shaft 34 and the hub 25 fixed thereto will be synchronized to the motor.

Figure 5:
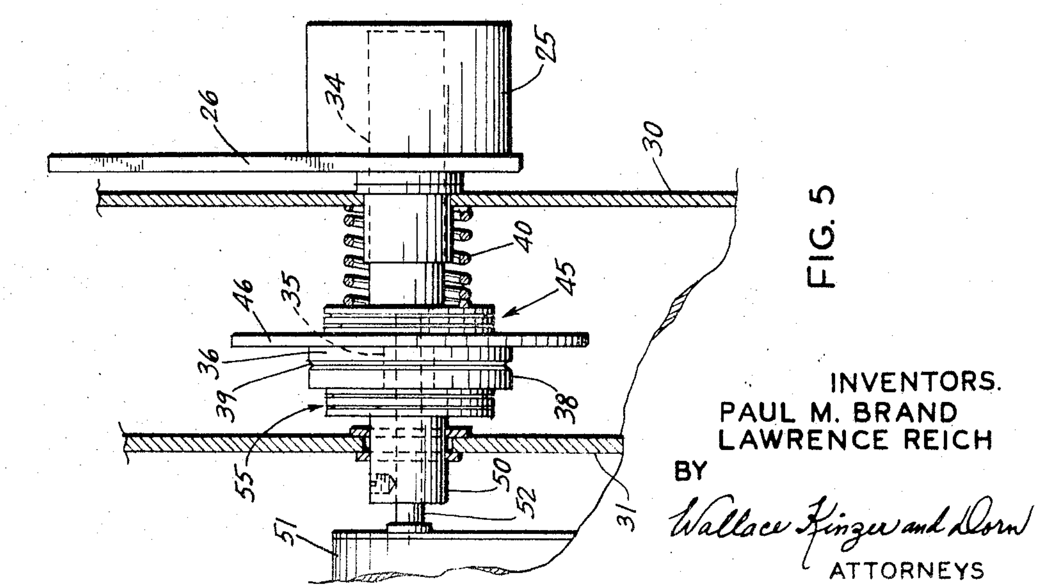
FIG. 5 is an enlarged sectional view of a portion of the structure shown in FIG. 4.

The clutch plates are normally held in engagement by a strong coil spring 40 which reacts between the inside face of the bracket 30 and an assembly of thrust elements 45, FIG. 5, including a clutch release plate or element 46. By exerting a thrust on the release plate 36 opposite the thrust of the spring 40 the clutch is in effect disengaged and this allows the dial D to be reset through spring 23.

The motor M is an accurate, constant speed timing motor and is coupled to a hub 50, FIG. 5, through a gear reducing box 51, the output shaft 52 of the gear reducer being keyed to the hub 50. The hub 50 is supported for rotation in the bracket 31 and carries the clutch plate 38, a suitable thrust bearing assembly 55 being interposed between the clutch plate 38 and the inside face of the bracket 31.

Thus when the motor is energized, the normally engaged clutch 36—38 is effective to transmit rotary power to the hub 34 causing the dial D to be turned and the spring 23 to be wound. As the spring winds, the striker 26 swings away gradually more and more from the zero stop 24. In effect, the striker 26 assumes a position in space corresponding to the time position of the dial D when the device is in operation, which is to say that the two move through the same degree of arc.

The motor is energized and concurrently dial D is reset by means of the manually operated button or plunger 20. The plunger 20 is suitably supported at the top of the bracket support 30—31 and is normally urged to an inactive position by a coil spring 60 as shown in FIG. 4. Thus the bracket 30 includes an extension 61, and this extension includes an aperture through which extends the lower end portion 20E of the plunger 20. A guide 62 is fixed to the bracket extension 61 and it includes an aperture through which extends the upper portion of the plunger 20. The plunger is provided with a collar 20C and the coil spring 60 surrounds the intermediate portion of the plunger 20, bearing against the collar 20C to hold the plunger in its normal elevated position.

The plunger 20, when depressed, enables both the motor to be energized and the clutch to be released. Thus the plunger 20 operates both a switch actuator for the motor and a clutch release arm. To this end the lower end 20E of the plunger 20, FIG. 4, is aligned with a switch actuator finger 65 fixed to and projecting from one end of a clutch disengaging lever in the form of a fork 66 which, as shown in FIGS. 4 and 5 presents two dependent fingers 67 and 68 adapted to bear on the clutch release plate or disc 46.

The clutch release fork or lever 66 is located between the brackets 30 and 31 and is pivotally supported on a pair of pins 69 in a bracket 70 carried at the rear face of the support bracket 30. The same spring 40 which holds the clutch normally engaged serves to normally position the fork 66 in its idle position shown in FIG. 4.

A normally open motor start switch 75, FIG. 4, is located on the same side of the bracket 31 as the motor M and includes a button 76 adapted to be depressed to close the switch and start the motor upon counterclockwise pivotal movement of the switch actuating finger 65 incidental to depressing the plunger 20. Concurrently with this action, fork 66 pivots counterclockwise, FIG. 4, causing the fingers 67 and 68 to press rearward on the clutch release plate 46 allowing the clutch to disengage or slip.

It will be appreciated of course that spring 23 is relatively weak since its only function is to restore or reset the dial D which occurs when the clutch is disengaged, which is also to say that spring 23 presents no substantial resistance to the torque of the motor M.

The wiring diagram is shown in FIG. 6. A relay 80 is located within housing H and may be fastened to one side of bracket 31. The stop button at the side of the housing is associated with a normally closed switch 81 in series with relay 80. Another normally closed switch 82 is in series with relay 80, and is so located within housing H as to be opened by the striker arm 26 when the latter reaches its 30 minute position.

The relay controls two normally open contacts 83 and 84, the former constituting a holding contact and the latter being in series with the motor M.

When the motor start switch 75 is closed, relay 80 is energized; its contact 84 closes, completing a circuit to the motor and its contact 83 closes thereby establishing a holding circuit so that relay 80 will remain energized when the start switch opens upon release of the plunger 20.

When the stop button for switch 81 is pressed at the end of the call (or when striker 26 actuates switch 82) the circuit to relay 80 is interrupted and the motor is stopped. We preferably include a pilot lamp 85 on the housing, FIG. 6, circuit to which is completed through contact 86 which closes when relay 80 is energized.

The person who places the long distance call will alert the operator and request the overtime rate. The index slide is then appropriately positioned. When conversation is established with the party being called, the person making the call then presses and instantly releases the plunger 20 (through knob K, FIG. 4) which disengages the clutch allowing spring 23 to release any stored energy as a result of any previous call. Dial D is therefore returned to its zero or start position, an operation which consumes about 1/20 of a second. Motor M is concurrently energized, and when the plunger 20 is released the clutch engages to transmit a drive to hub shaft 34. The dial D is slowly turned through the gear reducer to record both the time of the call and the mounting cost. At the end of the call the stop button at the side of the housing is pressed breaking the circuit of the motor. The overtime cost of the call is then recorded and is added to the basic 3-minute charge.

In the course of making the call the spring 23 was wound, and simultaneously the striker 27 was advanced away from the zero stop. This condition will prevail until the next call is made, and when the next call is made actuation of the plunger disengages the spring-type clutch whereupon the tensioned spring 23 takes over and the dial is reset, a condition manifest in the striker 26 ultimately engaging the zero stop 24. As stated, this resetting or restarting action is rapid enough to in no manner consume time having any significant effect on the timing cycle which is now set in operation.

Hence, while preferred embodiments of the invention have been described and illustrated, it is to be understood that they are capable of variation and modification, and we therefore do not wish to be limited to the precise details set forth, but desire to avail ourselves of such changes and alterations as fall within the purview of the following claims.

We claim:

1. Apparatus for indicating the cost of a long distance telephone call comprising a cost indicator settable by a rotary shaft, said cost indicator bearing information related to the cost of the call, a constant speed motor for driving the shaft during the course of a call thereby to set the cost indicator and register the cost of the call, a normally open start switch for the motor, a normally engaged clutch for coupling the output of the motor to the shaft whereby the shaft and cost indicator are synchronized with the motor, means for simultaneously disengaging the clutch and for resetting the shaft upon the commencement of the next call, the last-named means including a spring with the ends thereof so anchored as to be tensioned while the shaft is turning to store energy therein, said spring remaining tensioned until the clutch is disengaged, a start button to be actuated at the commencement of a call, and means effective on actuation of the start button to close the switch to energize the motor and to momentarily disengage the clutch allowing the tensioned spring to reset the shaft, the last-named means including a pivotally mounted clutch release lever having an extension thereon disposed in the path of the start button so as to be pivoted from an inactive to an active position when the start button is actuated, said clutch release lever having respective portions operable to actuate the motor start switch and disengage the clutch when in its active position, and a stop button to deenergize the motor at the termination of the call.

2. Apparatus according to claim 1 in which the clutch has a pair of plates normally urged into engagement by a spring surrounding said shaft, and the clutch release lever having an end bearing on a movable element of the clutch so that the spring which holds the clutch engaged also normally disposes the clutch release lever in its inactive position.

3. Apparatus according to claim 2 in which the cost indicator is a rotary member, the apparatus being provided with a zero stop defining the zero position of the rotary member, a striker on the shaft engageable with the zero stop upon resetting the shaft to stop the rotary member in its zero position and movable away from the stop as the shaft is being turned, said spring being a clock spring surrounding the shaft, one end of the spring engaging a fixed stop and the other end of the spring being anchored to a part movable with the shaft.

4. Apparatus according to claim 3 wherein the rotary member is a dial scribed with concentric circles each representing a different cost rate and a progression of charges based on the elapsed time of the call at that rate, a plate juxtaposed on the dial presenting a viewing slot through which the progression of charges may be observed, and an index slide at one side of the slot movable to the radius of the prevailing rate.

5. Apparatus for indicating the cost of a long distance telephone call comprising a cost indicator settable by a rotary shaft, said cost indicator bearing information related to the cost of the call, a constant speed motor for driving the shaft during the course of a call thereby to set the cost indicator and register the cost of the call, a normally open start switch for the motor, a normally engaged clutch for coupling the output of the motor to the shaft whereby the shaft and cost indicator are synchronized with the motor, means for simultaneously disengaging the clutch and for resetting the shaft upon the commencement of the next call, the last-named means including a spring with the ends thereof so anchored as to be tensioned while the shaft is turning to store energy therein, said spring remaining tensioned until the clutch is disengaged, a depressable start button to be actuated at the commencement of a call, said button being characterized by a depressable plunger which when depressed is effective in the movement thereof to operate the clutch disengaging means to allow the tensioned spring to reset the shaft and is effective in the same movement to produce closure of the start switch for the motor, and a stop button to deenergize the motor at the termination of the call.